US012638598B2

(12) United States Patent
Noguchi

(10) Patent No.: US 12,638,598 B2
(45) Date of Patent: May 26, 2026

(54) MOVEMENT AMOUNT ESTIMATION DEVICE, MOVEMENT AMOUNT ESTIMATION METHOD, AND COMPUTER READABLE NON-TRANSITORY STORAGE MEDIUM STORING MOVEMENT AMOUNT ESTIMATION PROGRAM

(71) Applicant: DENSO CORPORATION, Kariya-city (JP)

(72) Inventor: Kiyoto Noguchi, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 279 days.

(21) Appl. No.: 18/495,666

(22) Filed: Oct. 26, 2023

(65) Prior Publication Data

US 2024/0069218 A1 Feb. 29, 2024

Related U.S. Application Data

(63) Continuation of application No. PCT/JP2022/012926, filed on Mar. 21, 2022.

(30) Foreign Application Priority Data

Apr. 28, 2021 (JP) ................................. 2021-076513

(51) Int. Cl.
| | |
|---|---|
| *G01S 19/51* | (2010.01) |
| *G01S 19/43* | (2010.01) |
| *G01C 21/12* | (2006.01) |
| *G01C 21/30* | (2006.01) |

(52) U.S. Cl.
CPC .............. *G01S 19/51* (2013.01); *G01S 19/43* (2013.01); *G01C 21/12* (2013.01); *G01C 21/30* (2013.01)

(58) Field of Classification Search
None
See application file for complete search history.

(56) References Cited

U.S. PATENT DOCUMENTS

2021/0263165 A1* 8/2021 Zheng ..................... H04W 4/40
2021/0364647 A1* 11/2021 Suzuki .................. G01S 19/252

OTHER PUBLICATIONS

T. Suzuki, "Time-Relative RTK-GNSS: GNSS Loop Closure in Pose Graph Optimization," in IEEE Robotics and Automation Letters, vol. 5, No. 3, pp. 4735-4742, Jul. 2020. (Year: 2020).*
T.Suzuki(2020), "Time-Relative RTK-GNSS GNSS Loop Closure in Pose Graph Optimization", IEEE Robotics and Automation Letters, vol. 5, No. 3, Jul. 2020.

* cited by examiner

*Primary Examiner* — Vladimir Magloire
*Assistant Examiner* — Ashley Brown Raynal
(74) *Attorney, Agent, or Firm* — Precision Patents, P.C.

(57) ABSTRACT

By a movement amount estimation device, a movement amount estimation method, or a computer-readable non-transitory storage medium storing a movement amount estimation program, a degree of a priority of a combination of each of past satellite data acquired by a receiver at a plurality of past points and current satellite data acquired at a current point, for using the priority for estimating a movement amount is determined, and a relative movement amount from at least one of the plurality of past points to the current point is calculated.

15 Claims, 9 Drawing Sheets

START

ACQUIRE ESTIMATION ERROR
AT PAST POSITION — S161

DO FLOATING OPERATION — S162

DO NORMALIZATION,
SET TO RELIABILITY INDEX — S163

END

START

ACQUIRE POINT GROUP — S165

CALCULATE
NORMAL VECTOR OF POINT GROUP — S166

DISCRETIZE
INTO AZIMUTH AND ELEVATION,
CALCULATE OCCURRENCE PROBABILITY — S167

CALCULATE ENTROPY,
DO NORMALIZATION, AND
SET TO RELIABILITY INDEX — S168

END

1

MOVEMENT AMOUNT ESTIMATION DEVICE, MOVEMENT AMOUNT ESTIMATION METHOD, AND COMPUTER READABLE NON-TRANSITORY STORAGE MEDIUM STORING MOVEMENT AMOUNT ESTIMATION PROGRAM

CROSS REFERENCE TO RELATED APPLICATIONS

The present application is a continuation application of International Patent Application No. PCT/JP2022/012926 filed on Mar. 21, 2022, which designated the U.S. and claims the benefit of priority from Japanese Patent Application No. 2021-076513 filed on Apr. 28, 2021. The entire disclosures of all of the above applications are incorporated herein by reference.

TECHNICAL FIELD

The disclosure in this specification relates to a technology for estimating the movement amount of a mobile object between times.

BACKGROUND

As a comparative examples, there is a technology for estimating the movement amount of a mobile object including a receiver by performing time difference RTK (Real Time Kinematic) positioning based on past data and current data of a receiver.

SUMMARY

By a movement amount estimation device, a movement amount estimation method, or a computer-readable non-transitory storage medium storing a movement amount estimation program, a degree of a priority of a combination of each of past satellite data acquired by a receiver at a plurality of past points and current satellite data acquired at a current point, for using the priority for estimating a movement amount is determined, and a relative movement amount from at least one of the plurality of past points to the current point is calculated.

2

Figure 10:
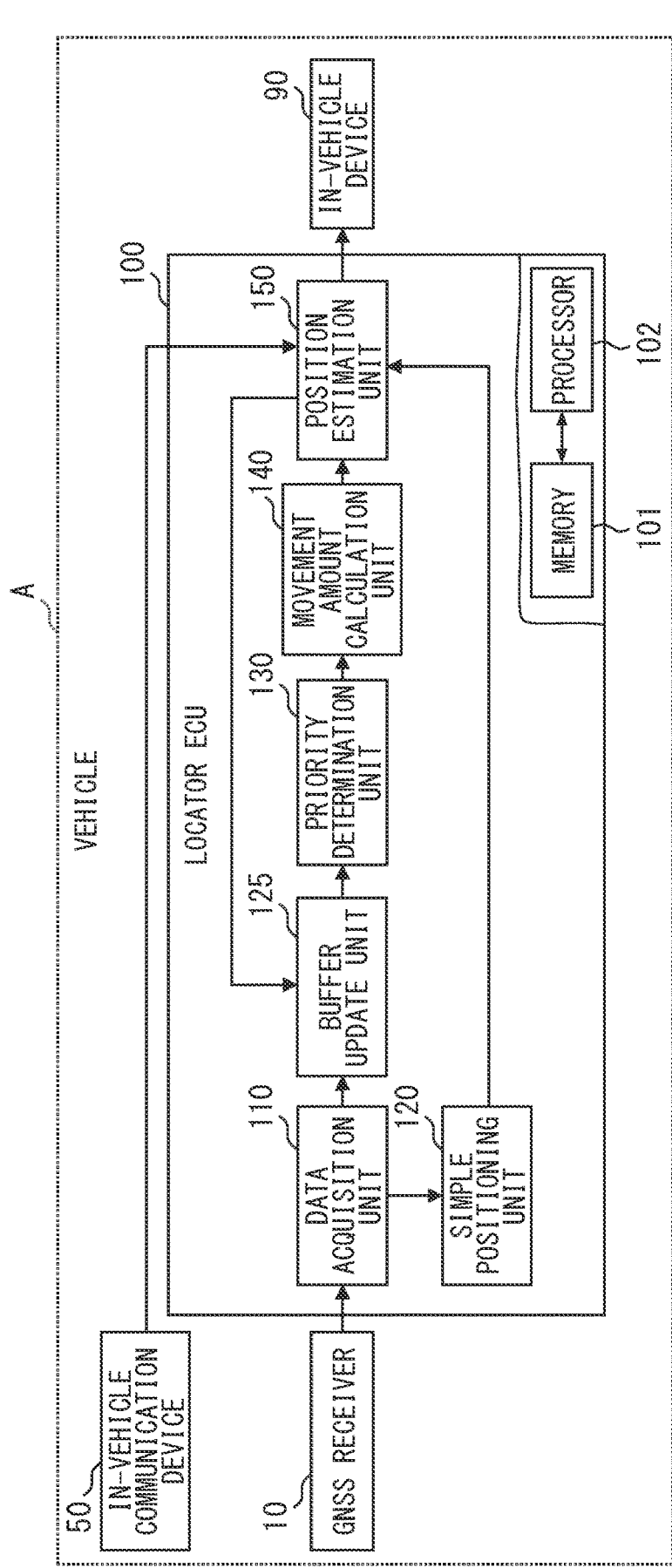

FIG. 10 is a block diagram showing an overall configuration of a system including a locator ECU according to a fourth embodiment.

Figure 11:
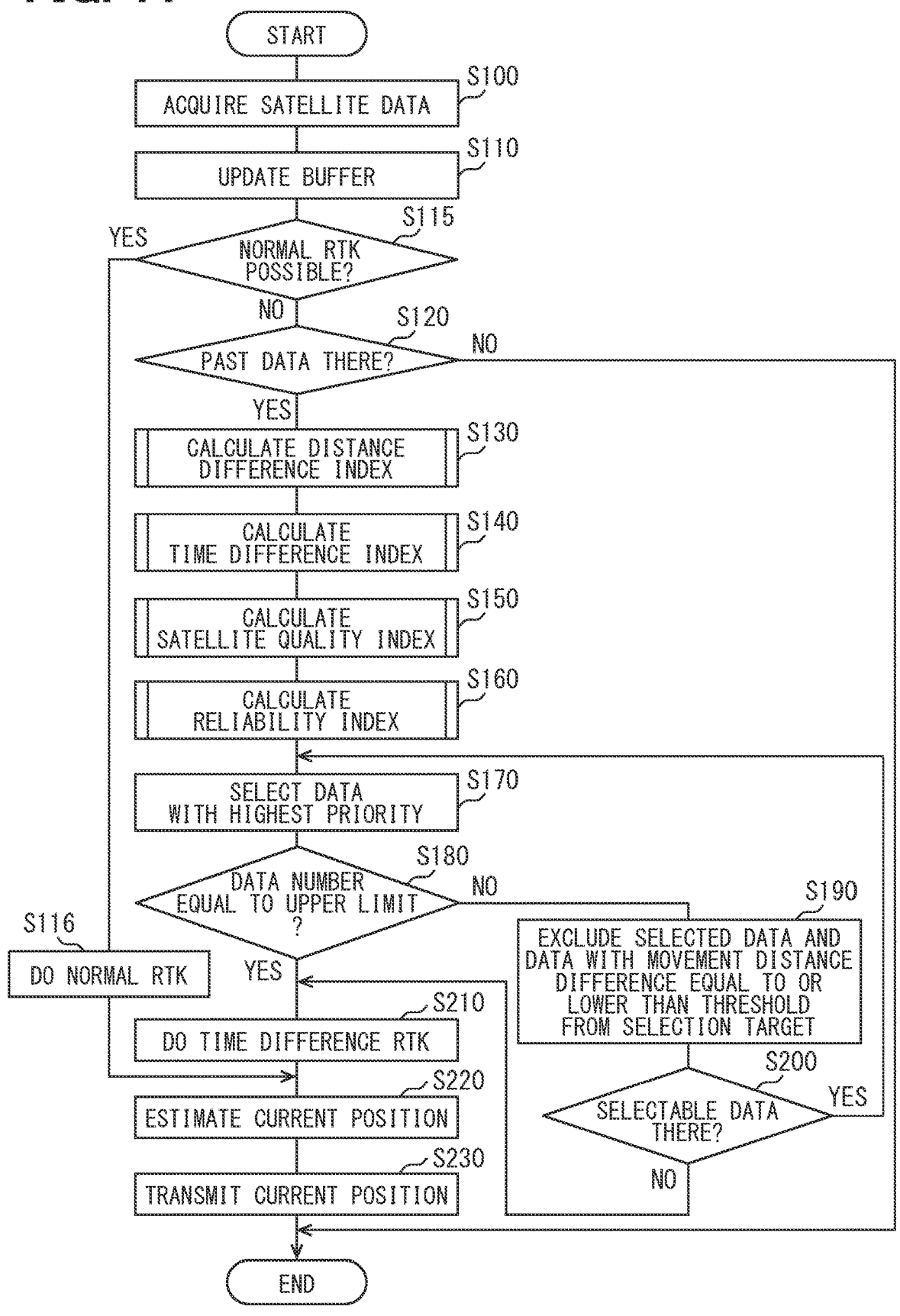

FIG. 11 is a flowchart showing one example of the movement amount estimation method executed by the locator ECU according to the fourth embodiment.

DETAILED DESCRIPTION

In time difference RTK positioning, there can be multiple past data to be combined with current data. However, when the time difference RTK is executed for all selectable combinations, the amount of calculation may increase.

One example of the disclosure provides a movement amount estimation device, a movement amount estimation method, and a computer-readable non-transitory storage medium storing a movement amount estimation program capable of reducing the amount of calculation.

According to one example embodiment, a movement amount estimation device is used for estimating a movement amount from at least one of a plurality of past points to a current point of a mobile object equipped with a receiver for receiving satellite data from a positioning satellite. The movement amount estimation device includes: a priority determination unit configured to determine a degree of a priority of a combination of each of past satellite data acquired by the receiver at the plurality of past points and current satellite data acquired at the current point, for using the priority for estimating the movement amount; and a movement amount calculation unit configured to calculate a relative movement amount from the at least one of the plurality of past points to the current point based on the combination of a high priority range having a higher priority than a low priority range.

According to another example embodiment, a movement amount estimation method is executed by a processor for estimating a movement amount from at least one of a plurality of past points to a current point of a mobile object equipped with a receiver for receiving satellite data from a positioning satellite. The movement amount estimation method includes: determining a degree of a priority of a combination of each of past satellite data acquired by the receiver at the plurality of past points and current satellite data acquired at the current point, for using the priority for estimating the movement amount; and calculating a relative movement amount from the at least one of the plurality of past points to the current point based on the combination of a high priority range having a higher priority than a low priority range.

Further, according to another example embodiment, a computer-readable non-transitory storage medium stores a movement amount estimation program including a plurality of instructions configured to, when executed by a processor for estimating a movement amount from at least one of a plurality of past points to a current point of a mobile object equipped with a receiver for receiving satellite data from a positioning satellite, cause the processor to: determine a degree of a priority of a combination of each of past satellite data acquired by the receiver at the plurality of past points and current satellite data acquired at the current point, for using the priority for estimating the movement amount; and calculate a relative movement amount from the at least one of the plurality of past points to the current point based on the combination of a high priority range having a higher priority than a low priority range.

According to these example embodiments, for combinations of each of the past satellite data acquired by the receiver at the plurality of past points with the current satellite data acquired at the current point, the degree of the priority is determined for using the estimation of the movement amount. Then, the relative movement amount from the past point to the current point is calculated based on the combination with the high priority range, which has a higher priority than the low priority range, among the combinations. Therefore, it is possible to appropriately determine the data to be combined with the current satellite data among the plurality of past satellite data based on the priority. Therefore, it is possible to prevent the use of larger amounts of past satellite data. Accordingly, it is possible to provide a movement amount estimation device, a movement amount estimation method, and a movement amount estimation program capable of reducing the amount of calculation.

First Embodiment

Figure 1:
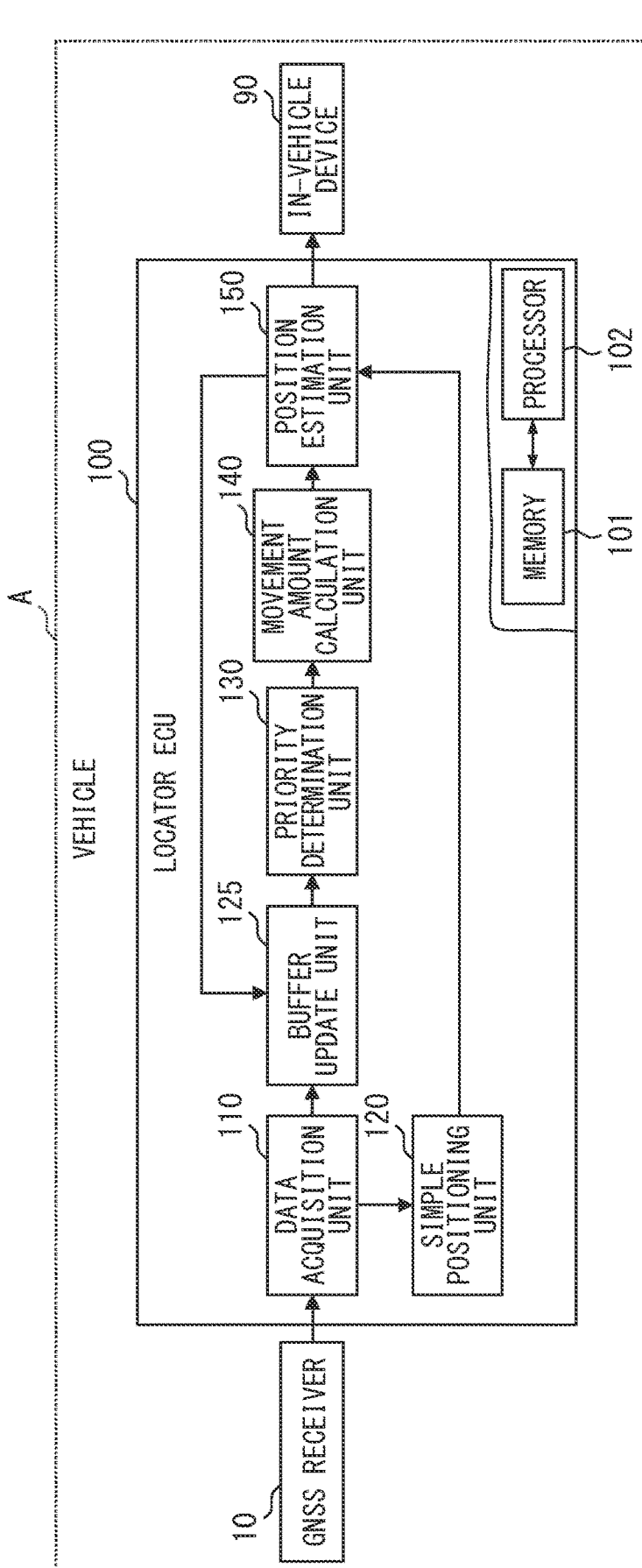
FIG. 1 is a block diagram showing an overall configuration of a system including a locator ECU.

As shown in FIG. 1, a movement amount estimation device according to an embodiment of the present disclosure is provided by a locator ECU 100. The locator ECU 100 is an electronic control unit mounted on a vehicle A, which is a mobile object.

The locator ECU 100 can acquire various types of information via an in-vehicle network including at least one of, for example, a local area network (LAN), a wire harness, and an internal bus. The information acquired from the in-vehicle network includes, for example, positioning signals from a GNSS receiver 10.

The GNSS receiver 10 receives positioning signals from positioning satellites constituting the GNSS (Global Navigation Satellite System). The GNSS receiver 10 generates observation data based on navigation signals and carriers of those signals. As an example, the observation data includes pseudorange, carrier phase, Doppler frequency, carrier-to-noise ratio, and occurrence or non-occurrence of cycle slips. The GNSS receiver 10 sequentially provides observation data to the locator ECU 100.

The locator ECU 100 is provided by a computer including at least one memory 101 and at least one processor 102. The memory 101 is at least one type of computer-readable non-transitory tangible storage medium, such as, for example, a semiconductor memory, a magnetic medium, an optical medium, for non-transitory storage of computer readable programs and data. The memory 101 stores various programs to be executed by the processor 102, such as a movement amount estimation program to be described later.

The processor 102 includes, for example, at least one of a central processing unit (CPU), a graphics processing unit (GPU), a reduced instruction set computer (RISC)-CPU, and the like as a core. The processor 102 executes multiple instructions included in the movement amount estimation program stored in the memory 101. Thereby, the locator ECU 100 constructs a plurality of functional units for estimating the current position of the vehicle A. As described above, in the locator ECU 100, the movement amount estimation program stored in the memory 101 causes the processor 102 to execute a plurality of instructions, thereby constructing a plurality of functional units. Specifically, as shown in FIG. 1, the locator ECU 100 includes functional units such as a data acquisition unit 110, a simple positioning unit 120, a priority determination unit 130, a movement amount calculation unit 140, and a position estimation unit 150.

The data acquisition unit 110 acquires new observation data received by the GNSS receiver 10. The data acquisition unit 110 stores the new observation data in a buffer. In addition, the data acquisition unit 110 sequentially provides the data to the simple positioning unit 120 and the priority determination unit 130.

The simple positioning unit 120 estimates a self-position of the vehicle A by a method that does not use a time difference RTK, which will be described later. For example, the simple positioning unit 120 may estimate the self-position based on independent positioning or satellite positioning such as DGPS. Below, the self-position estimated by the simple positioning unit 120 may be referred to as a provisional self-position. In addition, the simple positioning unit 120 calculates a movement distance after the GNSS receiver 10 is powered on based on the estimated position. The simple positioning unit 120 may calculate the movement distance after the locator ECU 100 itself is powered on. Alternatively, the simple positioning unit 120 may calculate the movement distance after the vehicle A is activated. The simple positioning unit 120 may calculate the movement distance by dead reckoning based on vehicle speed information or the like detected by a vehicle speed sensor. The simple positioning unit 120 may calculate the Doppler speed of the GNSS receiver 10 calculated based on the Doppler frequency as the estimation movement speed of the vehicle A.

A buffer update unit 125 updates the buffer based on the observation data and the positioning result data by the simple positioning unit 120. Specifically, when there is buffer data acquired before a threshold time or before the threshold time, the buffer update unit 125 deletes the data. Then, the buffer update unit 125 stores the acquired latest observation data and positioning result data in the memory 101 as new buffer data. The positioning result data includes the provisional self-position and the movement distance after the power of the GNSS receiver 10 is turned on. The current position estimated by the position estimation unit 150, which will be described later, may be stored instead of the provisional self-position.

The priority determination unit 130 determines the degree of priority used for estimating the movement amount for each combination of the past satellite data acquired at a plurality of past points and the current satellite data acquired at the current point.

The priority determination unit 130 quantifies the priority based on a plurality of indices, thereby making it possible to compare the degree of priority. The indices are, for example, three parameters: a distance difference index; a time difference index; and a satellite quality index.

The distance difference index indicates the magnitude of the distance difference between the movement distance from a reference point to the point (past point) where past satellite data was acquired and the movement distance from the reference point to the point (current point) where current satellite data was acquired. For example, the reference point is the point where the GNSS receiver 10 is powered on. The distance difference index is, for example, a normalized distance difference between movement distances from when the GNSS receiver 10 is powered on. Specifically, the priority determination unit 130 calculates a distance difference index based on the following first equation. In the following, id1 is the distance difference index. D is the distance difference between the movement distance from the power-on of the GNSS receiver 10 at the acquisition point of the current satellite data and the movement distance from the power-on of the GNSS receiver 10 at the acquisition point of the past satellite data. Nmin is the normalized minimum value, and Nmax is the normalized maximum value. The normalized minimum value and the normalized maximum value are predefined values.

(First equation)

$$id1=(D-N\text{min})/(N\text{max}-N\text{min}) \tag{1}$$

The priority determination unit 130 sets D=Nmin when the distance difference is less than the normalized minimum value. Also, when the distance difference is larger than the normalized maximum value, the priority determination unit 130 sets D=Nmax.

The time difference index is an index that indicates the magnitude of the elapsed time from the acquisition time of the past satellite data to the acquisition time of the current satellite data. The time difference index is normalized similarly to the distance difference index based on the following second equation. In the following, id2 is the time difference index. Also, T is the difference between the time elapsed since the GNSS receiver 10 was powered on at the acquisition time of the current satellite data and the time elapsed since the power of the GNSS receiver 10 was turned on at the acquisition time of the past satellite data.

(Second equation)

$$id2=(N\text{min}-T)/(N\text{max}-N\text{min}) \tag{2}$$

As in the case of the distance difference, the priority determination unit 130 sets T=Nmin when the time difference is less than the normalized minimum value, and T=Nmax when the time difference is larger than the normalized maximum value.

The satellite quality index is an index that indicates the quality of acquired satellite data. The satellite quality index is obtained by normalizing the number of signals of which cycle slip did not occur from the acquisition time of the past satellite data to the acquisition time of the current satellite data, for example. The satellite quality index is normalized by the similar manner to the distance difference index, based on the following third equation. In the following, id3 is the satellite quality index, and N is the number of signals.

(Third equation)

$$id3=(N-N\text{min})/(N\text{max}-N\text{min}) \tag{3}$$

As in the case of the distance difference and the time difference, when the number of signals is less than the normalized minimum value, the priority determination unit 130 sets N=Nmin, and when the time difference is larger than the normalized maximum value, the priority determination unit 130 sets N=Nmax. Also, the values of Nmax and Nmin are different for each of the above three equations.

The priority determination unit 130 calculates the sum of the above indices as the priority. The priority determination unit 130 calculates the priority of each buffered past satellite data, and sequentially provides the result to the movement amount calculation unit 140.

The priority determination unit 130 may set weights for the parameters. For example, the priority determination unit 130 sets a weight based on a vehicle speed to the movement distance difference. Specifically, when the vehicle speed falls within the predetermined range, the priority determination unit 130 adjusts the weight so that the weight of the movement distance difference is smaller than when the vehicle speed is outside the predetermined range (for example, the weight becomes zero). Here, the predetermined range is a numerical range within which the vehicle speed is less than or equal to the threshold value. The priority determination unit 130 may set weights according to predetermined conditions for other priority parameters.

The movement amount calculation unit 140 calculates the relative movement amount from the past point to the current point based on the combination of the high priority range having a higher priority than the low priority range. For example, the movement amount calculation unit 140 selects a specified number (for example, 10) of combinations from the combinations in order of priority as combinations to be used for the movement amount calculation. In this case, the priority range containing each priority in each selected combination results in the high priority range, and the priority range containing each priority in the non-selected combination is included in the low priority range. The movement amount calculation unit 140 may set a threshold that serves as a boundary between the high priority range and the low priority range, and select a combination that is greater than or equal to the threshold.

The movement amount calculation unit 140 performs time difference RTK based on the plurality of selected past satellite data. Thereby, the movement amount calculation unit 140 estimates the movement amount of the vehicle A from the acquisition time of each past satellite data to the acquisition time of the current satellite data. The movement amount calculation unit 140 may calculate a movement vector from the past position to the current position as the movement amount. The movement amount calculation unit 140 provides the calculated movement vector to the position estimation unit 150.

The time difference RTK performed by the movement amount calculation unit 140 will be described. In this embodiment, the expression of "performing time difference RTK" includes at least the calculation of the relative movement amount (movement vector) of the mobile object (vehicle A in the present embodiment), and does not necessarily include the estimation of the absolute position of the mobile object based on the movement amount. Further, in the following description, RTK positioning for calculating a baseline vector from a known reference station to a mobile object may be usually referred to as normal RTK in order to distinguish it from time difference RTK.

The time difference RTK is a positioning method that calculates a relative movement vector from the past time to the current time of the mobile object by replacing the reference station in the normal RTK with the mobile object at the past time.

Specifically, in the time difference RTK, a single difference of the carrier wave phase is a difference between the carrier phase of the positioning signal received by the GNSS receiver 10 at the current time and that of the positioning signal received by the same GNSS receiver 10 at the past time. Accordingly, the difference between the above single difference for a particular reference satellite and the single difference for other satellites is a double difference in the time difference RTK.

The movement amount calculation unit 140 calculates this double difference based on the buffered past satellite data and current satellite data. The movement amount calculation unit 140 calculates the double difference between the reference satellite and a plurality of other satellites (for example, four or more satellites). The movement amount calculation unit 140 performs parameter estimation such as the least squares method or the Kalman filter based on the calculated multiple double differences. Thereby, the movement amount calculation unit 140 calculates a relative movement vector from the past time to the current time of the mobile object.

The position estimation unit 150 calculates the current position of vehicle A as an estimation position based on the movement vector. For example, the position estimation unit 150 combines the position estimated based on the past position and the movement vector and the position estimated without using the time difference RTK by the simple positioning unit 120 to estimate the current position. The position estimation unit 150 may use the average value of the above two pieces of position information as the current position, or may estimate the current position by the Kalman filter using the two pieces of position information as an observation amount. The position estimation unit 150 outputs the estimated current position to the in-vehicle device 90 as the own position of the vehicle A. Here, the in-vehicle device 90 is a device that executes an application using the current position estimated by the locator ECU 100. Note that the position estimation unit 150 may transmit the current position to external components of the vehicle A, such as a server device and other vehicles, instead of the in-vehicle device 90.

Figure 2:
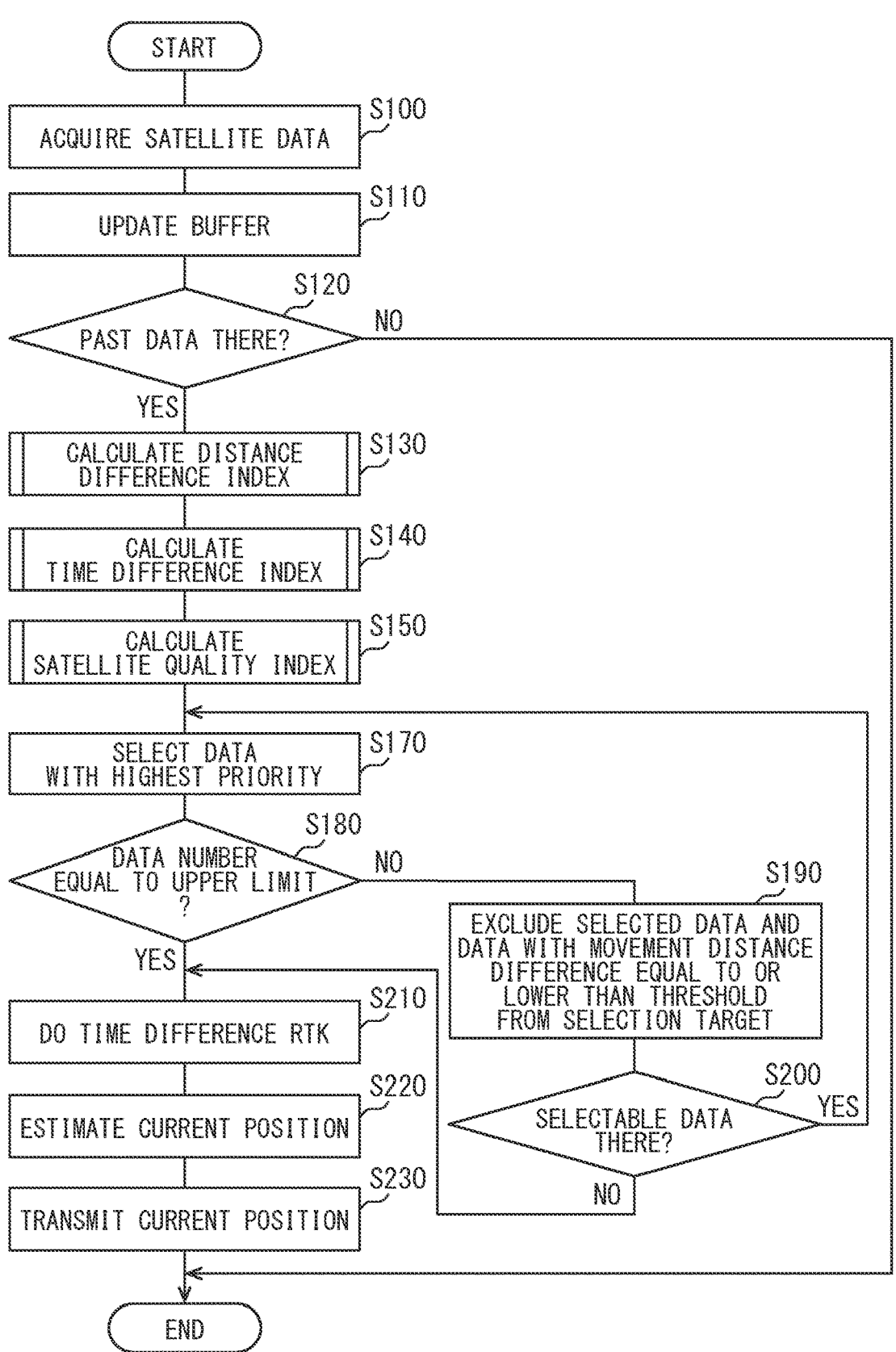
FIG. 2 is a flowchart showing one example of a movement amount estimation method executed by the locator ECU.

Next, a flow of the movement amount estimation method executed by the locator ECU 100 in cooperation with the functional blocks will be described below with reference to FIG. 2. In a flowchart to be described later, "S" indicates one or more processes of the flowchart to be executed by one or more instructions included in the program.

First, in S100, the data acquisition unit 110 acquires the latest satellite data received by the GNSS receiver 10. Next, in S110, the data acquisition unit 110 updates the buffer with the acquired satellite data. Specifically, the data acquisition unit 110 deletes, from the buffer, satellite data of which time from the acquisition is equal to or more than the threshold time. The data acquisition unit 110 then adds the latest satellite data to the buffer.

After the process of S110, in S120, the priority determination unit 130 determines whether past satellite data (past data) exists. When it is determined that the past data exists, the flow shifts to S130.

In S130, the priority determination unit 130 calculates the movement distance difference as one of the parameters for determining priority.

Figure 3:
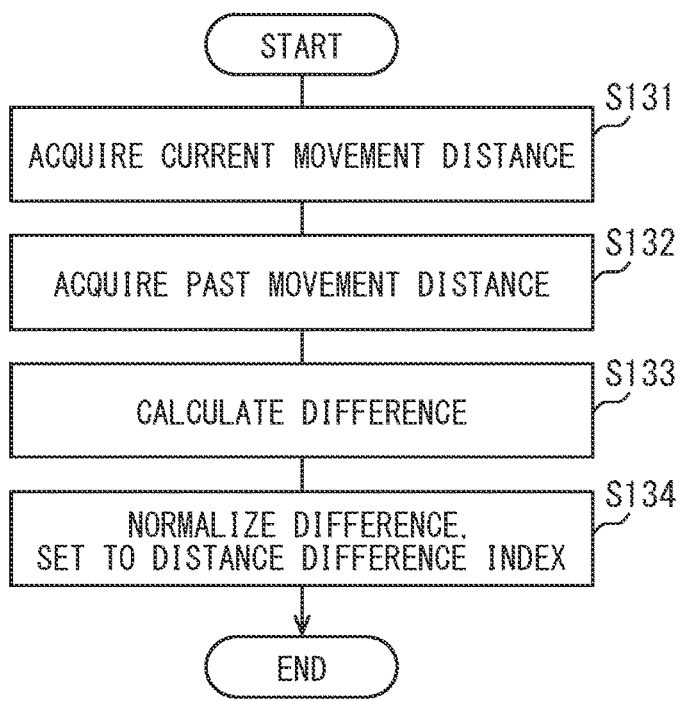
FIG. 3 is a flowchart showing detailed processes of a process in FIG. 2.

Details of the process of S130 will be described with reference to a flowchart of FIG. 3. First, in S131, the current movement distance is obtained. Next, in S132, the movement distance at the time of acquisition of the past satellite data to be combined is acquired. Then, in S133, the difference between the two movement distances is calculated. Subsequently, in S134, the difference is normalized. This normalized difference is taken as the movement distance difference.

Figure 4:
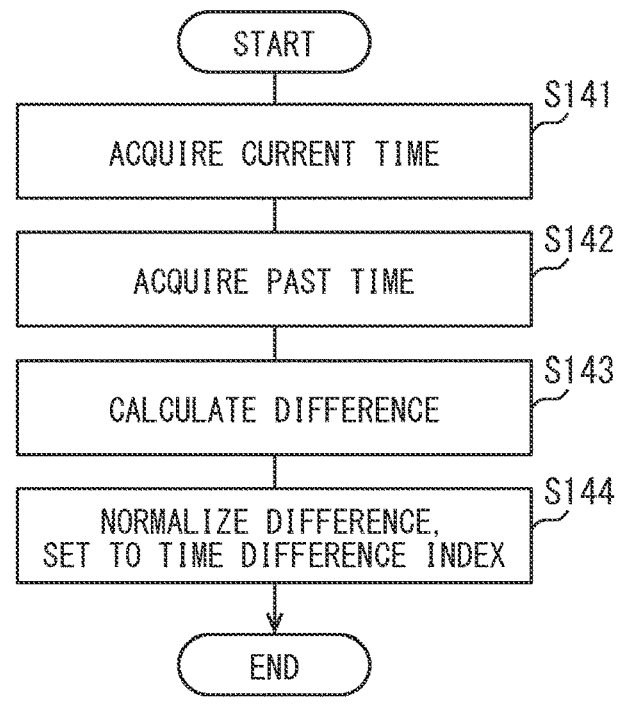
FIG. 4 is a flowchart showing detailed processes of a process in FIG. 2.

Returning to FIG. 2, in S140, the priority determination unit 130 calculates the time difference as one of the parameters for determining priority. Details of the process of S140 will be described with reference to a flowchart of FIG. 4. First, in S141, the current time is obtained. Next, in S142, the time when the past satellite data to be combined is acquired is acquired. Note that the time here may be the elapsed time with the power-on of the GNSS receiver 10 as the reference time. Then, in S143, the difference between the two times is calculated. Subsequently, in S144, the difference is normalized. This normalized difference is the time difference.

Figure 5:
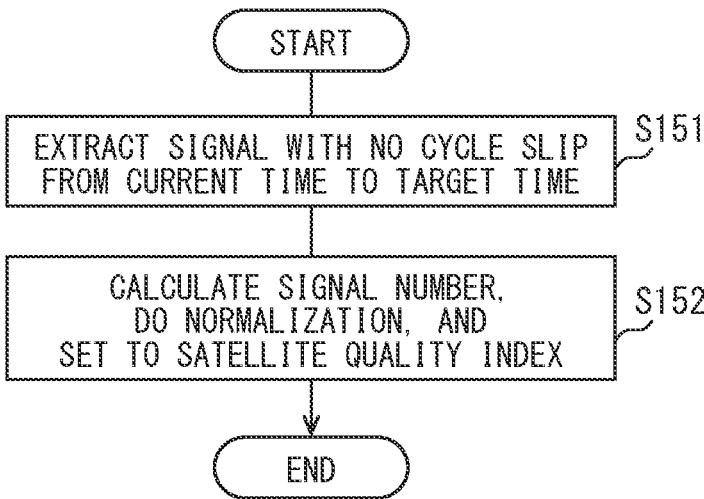
FIG. 5 is a flowchart showing detailed processes of a process in FIG. 2.

Returning to FIG. 2, in S150, the priority determination unit 130 calculates the satellite quality as one of the parameters for determining priority. Details of the process of S150 will be described with reference to a flowchart of FIG. 5. First, in S151, a signal that did not cause a cycle slip in a period from the current time to the target time (past time) is extracted. Then, in S152, the number of signals that did not cause the cycle slip is calculated and normalized. This normalized number of signals is taken as the satellite quality index.

Returning to FIG. 2, in S170, the priority determination unit 130 selects satellite data with the highest priority from the buffered satellite data. Here, the priority determination unit 130 sets the sum of the above three parameters as the priority. Next, in S180, the priority determination unit 130 determines whether the number of selected satellite data has reached the upper limit (for example, about 10). When it is determined that the upper limit has not been reached, the flow shifts to S190. On the other hand, when it is determined that the upper limit has been reached, the flow shifts to S210.

In S190, the priority determination unit 130 excludes satellite data, among the satellite data stored in the buffer, whose movement distance difference from the selected satellite data is equal to or less than a threshold value from the selection targets. In the following S200, the priority determination unit 130 determines whether selectable satellite data remains. When it is determined that satellite data remains, the flow returns to S170. On the other hand, when it is determined that no satellite data remains, the flow shifts to S210. Through the series of processes from S170 to S200, a plurality of pieces of satellite data having a relatively high priority and the positions of the vehicle A at the time of acquisition are selected, the positions being relatively distant from each other.

In S210, the movement amount calculation unit 140 executes the time difference RTK based on the combination of the selected past satellite data and the current satellite data, and calculates the movement amount from each past position to the current position. Next, in S220, the position estimation unit 150 estimates the current position of the vehicle A based on the movement amount. Specifically, the position estimation unit 150 transmits the estimated current position to the in-vehicle device 90 in S230. Note that the position estimation unit 150 may transmit the current position to the outside of the vehicle A. In the above, S130, S140, S150, S170, S180, S190, and S200 are examples of the "priority determination process", and S210 is an example of the "movement amount calculation process".

According to the first embodiment described above, for combinations of each of the past satellite data acquired by the GNSS receiver 10 at a plurality of past points with the current satellite data acquired at the current point, the degree of the priority is determined for using the estimation of the movement amount. Then, the relative movement amount from the past point to the current point is calculated based on the combination with the high priority range, which has a higher priority than the low priority range, among the combinations. Therefore, it is possible to appropriately determine the data to be combined with the current satellite data among the plurality of past satellite data based on the priority. Therefore, it is possible to prevent the use of larger amounts of past satellite data. Therefore, in estimating the movement amount, it may be possible to reduce the calculation amount.

Further, according to the first embodiment, a higher priority is set for a combination having a larger difference between the movement distance of the vehicle A from the reference point to the past point and the movement distance from the reference point to the current point. According to this, it is possible to more appropriately utilize the calculation of the movement amount based on the time difference RTK, whose accuracy is unlikely to decrease even if the movement distance increases.

Further, according to the first embodiment, a higher priority is set for a combination with a smaller elapsed time from the acquisition of past satellite data to the current acquisition of satellite data, that is, a combination with a smaller time difference. In the RTK positioning, the larger the time difference, the greater the effects of satellite clock errors, variations in ionospheric and tropospheric delays, and the like, so that the accuracy may reduce. Therefore, by giving a higher priority to the smaller time difference, a combination with a large time difference and a large decrease in accuracy becomes difficult to be utilized for calculating the movement amount. Therefore, it is possible to further improve the accuracy of movement amount calculation.

In addition, according to the first embodiment, a higher priority is set for a combination with higher past satellite data quality. Therefore, a combination that facilitates increasing the accuracy of movement amount calculation is more likely to be used for calculating the movement amount. Accordingly, it is possible to further improve the accuracy of movement amount calculation.

Further, according to the first embodiment, the priority is determined based on a plurality of indices, and weights are set for each index according to conditions. Therefore, it becomes easier to determine the priority according to the traveling state of the vehicle A, and it is possible to utilize a combination more suited to the situation for calculating the movement amount.

Furthermore, according to the first embodiment, the weight of the distance difference index is set smaller as the travel speed of the vehicle A decreases. When the travel speed is low, there is a high possibility that the vehicle speed sensor cannot accurately detect the travel speed due to slippage. This can occur, for example, in the case of vehicle speed sensors that detect a wheel speed. By reducing the weight of the distance difference index in such a case, it may be possible to reduce the influence on the movement distance calculation based on the inaccurate travel speed.

Second Embodiment

Figure 6:
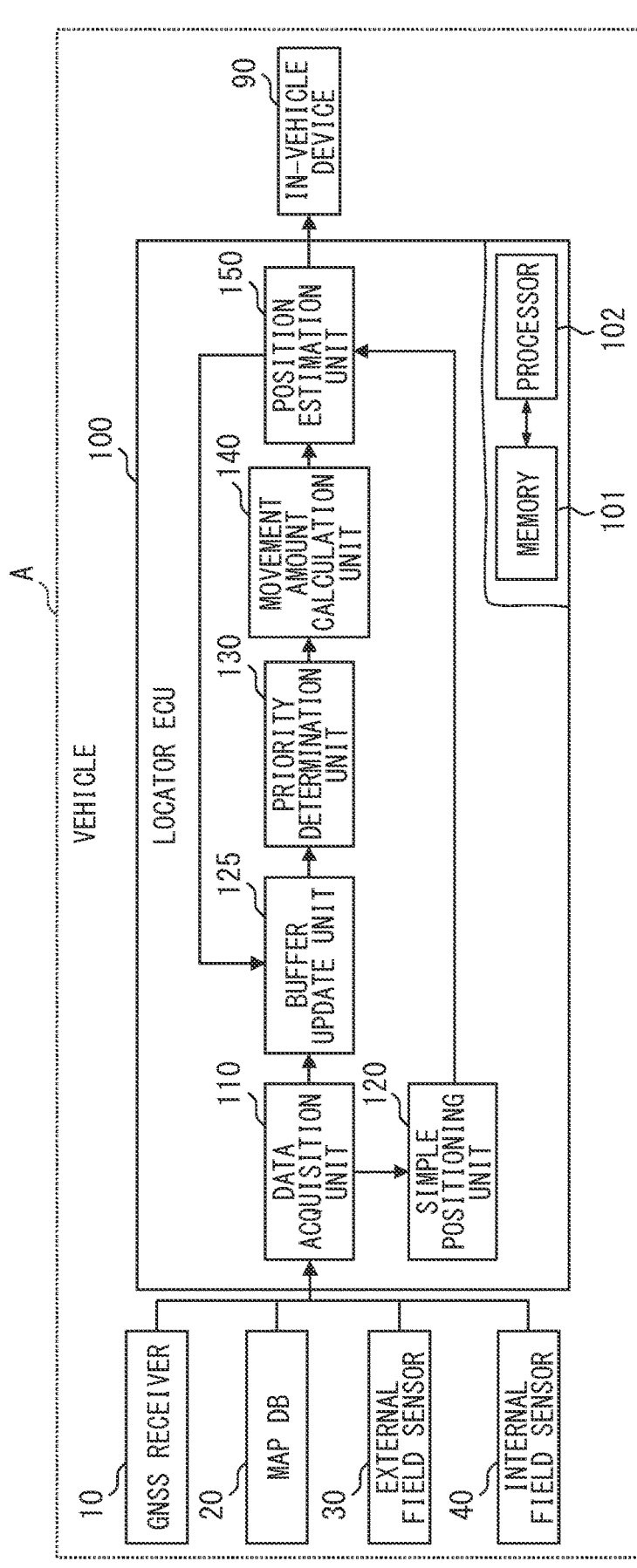
FIG. 6 is a block diagram showing a schematic configuration of a system including a locator ECU according to a second embodiment.
Figure 7:
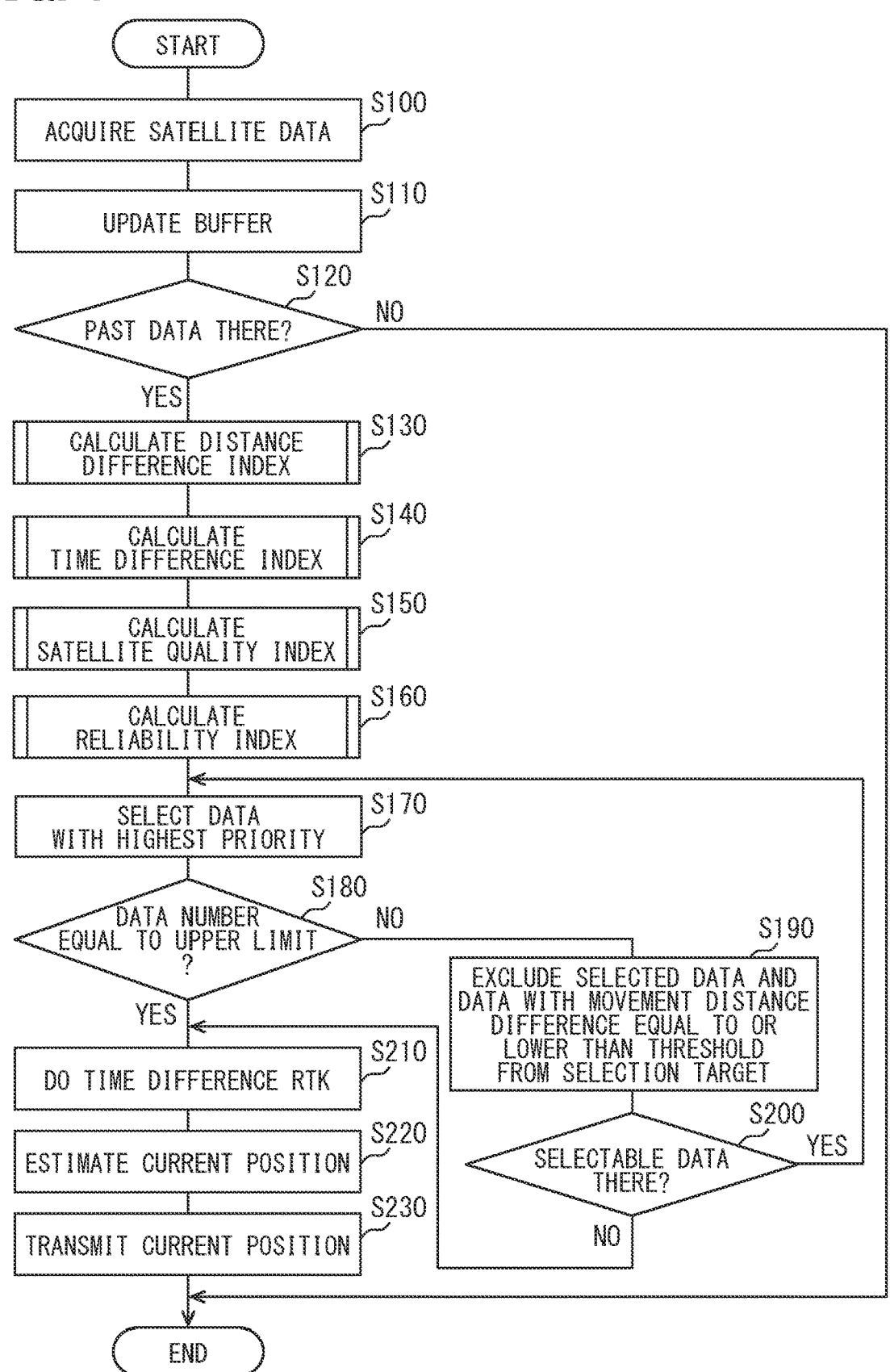
FIG. 7 is a flowchart showing one example of a movement amount estimation method executed by the locator ECU according to the second embodiment.
Figure 8:
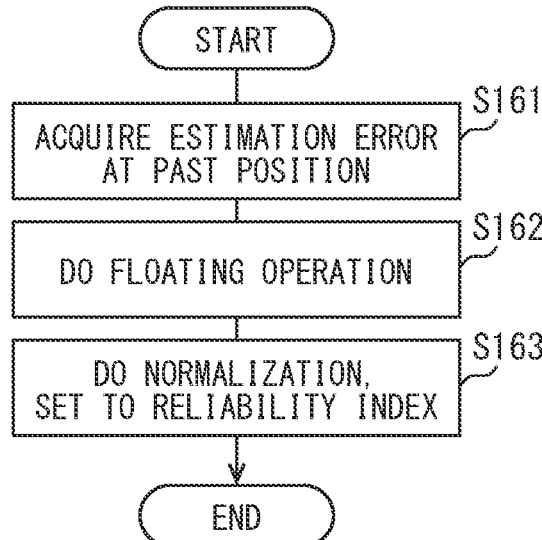
FIG. 8 is a flowchart showing detailed processes of a process in FIG. 7.

In a second embodiment, a modification example of the locator ECU 100 described in the first embodiment will be described. In FIG. 6 to FIG. 8, the components denoted by the same reference numerals as those in the drawings of the first embodiment are equivalent components and have similar functions and effects.

In the second embodiment, the locator ECU 100 acquires information from the GNSS receiver 10, a map DB 20, an external field sensor 30, and an internal field sensor 40 via the in-vehicle network.

The map DB 20 is a nonvolatile memory, and stores map data such as link data, node data, road shape, structures and the like. The map data may include a three-dimensional map including feature points of road shapes and buildings. Note that the three-dimensional map may be generated based on an image captured by REM (registered trademark). Further, the map data may include traffic regulation information, road construction information, meteorological information, signal information and the like. The map data stored in the map DB 20 may be updated periodically or as needed based on the latest information delivered from a server installed outside the vehicle A.

The external field sensor 30 is an autonomous sensor that monitors the external environment of the vehicle A. The external field sensor 30 may be, for example, a LIDAR (Light Detection and Ranging/Laser Imaging Detection and Ranging) that detects a point group of characteristic points of a feature, or a periphery monitoring camera having a predetermined imaging range including the front of the vehicle A.

The internal field sensor 40 is a sensor that detects a physical quantity related to the internal field of the vehicle A. For example, the internal field sensor 40 includes a vehicle speed sensor that detects the travel speed of the vehicle A and an IMU that detects the inertial force acting on the vehicle A. The IMU is configured to detect angular velocity and acceleration. The IMU may be provided by, for example, a six-axis motion sensor having a three-axis gyro sensor and a three-axis acceleration sensor.

In the second embodiment, the data acquisition unit 110 acquires information necessary for executing a self-position estimation method other than the time difference RTK, in addition to observation data. For example, the data acquisition unit 110 acquires point group information by LiDAR and point group map data stored in the map DB 20 as information necessary for scan matching. Alternatively, the data acquisition unit 110 may acquire the image captured by the camera and the map data.

The simple positioning unit 120 estimates the provisional self-position based on the data acquired by the data acquisition unit 110. The simple positioning unit 120 may estimate the provisional self-position based on scan matching between the point group information and the point group map data, matching between captured images and map landmarks, and the like.

The buffer update unit 125 further stores the reliability of the estimated position, which will be described later, as buffer data. Alternatively, the buffer update unit 125 may store the reliability of the provisional self-position.

The priority determination unit 130 further calculates a reliability index as an index for determining the priority. The reliability index is a parameter calculated based on the reliability of the estimated position of the past point. That is, in the second embodiment, the priority determination unit 130 calculates the priority based on four parameters.

The position estimation unit 150 calculates the position of vehicle A based on the provisional self-position estimated by the simple positioning unit 120 and the movement amount calculated by movement amount calculation unit 140. At this time, the position estimation unit 150 further calculates the reliability of the estimated self-position (position reliability). The position estimation unit 150 may calculate the normalized estimation error as the reliability index.

Next, the flow of the movement amount estimation method executed by the locator ECU 100 of the second embodiment in cooperation with the functional blocks will be described below with reference to FIG. 7. For the processes with the same reference numerals as those in the flow of FIG. 2, the description of the first embodiment is used.

After the satellite quality index is calculated in S150, the flow shifts to S160. In S160, the priority determination unit 130 calculates the position reliability.

Details of the process of S160 will be described with reference to a flowchart of FIG. 8. First, in S161, an estimation error in the past position is acquired. Next, in S162, the estimation error is floated. Specifically, a three-dimensional root sum of squares is calculated based on the estimation errors in the three directions. Then, in S163, the floated estimation error is normalized. This normalized estimation error is used as the position reliability. After the process of S163 is executed, the flow advances to S170 in FIG. 7. In the above, in addition to the processes shown in the first embodiment, S160 is included as an example of the "priority determination process".

According to the second embodiment described above, a higher priority is set for a combination with a higher reliability of the estimated position at the past point. Therefore, it is possible to preferentially select a combination that enables higher estimation accuracy of the current position based on the past point and the movement amount.

Third Embodiment

Figure 9:
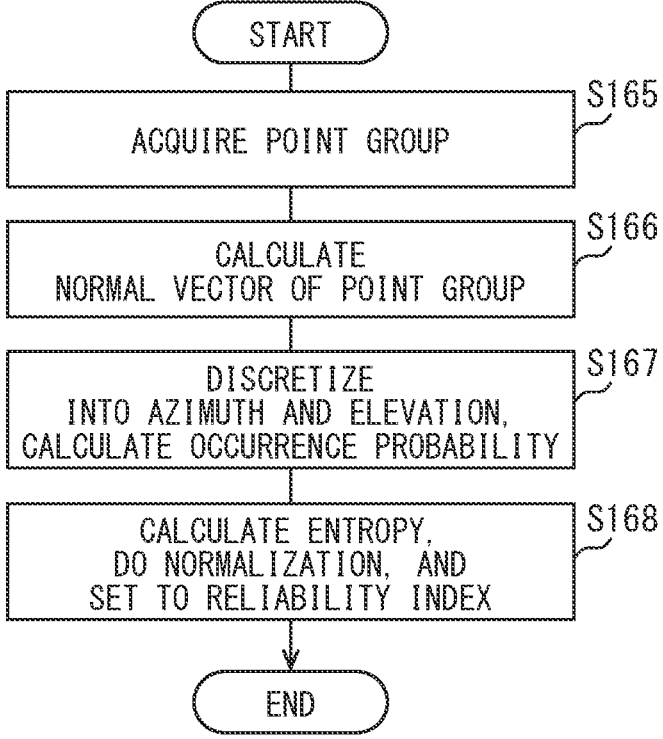
FIG. 9 is a flowchart showing detailed processes of a process in FIG. 7 according to a third embodiment.

In a third embodiment, a modification example of the locator ECU 100 described in the first embodiment will be described. In FIG. 9, components denoted by the same reference numerals as those in the drawings of the first embodiment are similar components and exhibit the same operation and effects.

In the locator ECU 100 of the third embodiment, the position estimation unit 150 estimates the estimated position by scan matching based on the point group information, as in the second embodiment. In this case, the priority determination unit 130 can calculate the positional reliability as one of the priority parameters as in the second embodiment. In this case, the priority determination unit 130 calculates the reliability index based on the entropy of the normal distribution in the point group used when calculating the estimation position.

More specifically, the priority determination unit 130 calculates the elevation angle component and the azimuth angle component of the normal vector for each point of the point group. Then, the priority determination unit 130 discretizes each point into a two-dimensional grid of elevation angle components and azimuth angle components. The priority determination unit 130 discretizes all points to calculate the number of occurrences for each grid, and divides the number of occurrences by the number of points in the point group to calculate the occurrence probability of each grid. It is assumed that the number of grids is L and the occurrence probability of each grid is pi, and an entropy H can be calculated by the following equation (4). The priority determination unit 130 uses the value obtained by normalizing the entropy as the reliability index.

(Fourth equation)

$$H = -\sum_{i}^{L} p_i \times \log_2 p_i \tag{4}$$

Next, the flow of the movement amount estimation method executed by the locator ECU 100 of the third embodiment in cooperation with the functional blocks will be described below with reference to FIG. 9. In the third embodiment, the detailed process of S160 in FIG. 7 is executed according to the flow in FIG. 9. First, in S165, the point group detected by the LiDAR device is obtained. Next, in S166, the normal vector of the point group is calculated. Then, in S167, the normal vector is discretized by the elevation angle and the azimuth angle, and the occurrence probability is calculated. Next, in S168, the entropy is calculated based on the occurrence probability, and the entropy is normalized. This normalized entropy becomes the reliability index. After the process of S168 is executed, the flow advances to S170 in FIG. 7.

Fourth Embodiment

In a fourth embodiment, a modification example of the locator ECU 100 described in the first embodiment will be described. In FIG. 10 and FIG. 11, the components denoted by the same reference symbols as those in the drawings of the first embodiment are equivalent to the components in the first embodiment, and provide similar operational effects.

In the fourth embodiment, in addition to the GNSS receiver 10, the locator ECU 100 acquires information from the in-vehicle communication device 50 via the in-vehicle network. The in-vehicle communication device 50 is a communication module mounted on the vehicle A. The in-vehicle communication device 50 has at least a function of V2N (Vehicle to cellular Network) communication conforming to communication standards such as LTE (Long Term Evolution) and 5G. The in-vehicle communication device 50 can receive correction information that is normally used in the normal RTK from a reference station in the periphery of the vehicle A. The in-vehicle communication device 50 sequentially provides the acquired correction information to the locator ECU 100.

The position estimation unit 150 in the fourth embodiment estimates the self-position by the normal RTK when the normal RTK can be executed. On the other hand, the position estimation unit 150 estimates the self-position based on the time difference RTK when the normal RTK cannot be executed. For example, the position estimation unit 150 may determine that the normal RTK cannot be executed when the communication with the reference station is interrupted, when the communication delay is large, when there is the failure in the reference station, or when the reference station does not exist nearby.

Next, the flow of the movement amount estimation method executed by the locator ECU 100 of the third embodiment in cooperation with the functional blocks will be described below with reference to FIG. 11. For the processes with the same reference numerals as those in the flows of FIGS. 2 and 7, the description of the first embodiment is used.

After the process of S110, the flow shifts to S115. In S115, the position estimation unit 150 determines whether the normal RTK can be executed. When it is determined that the normal RTK cannot be executed, the flow shifts to S120. On the other hand, when it is determined that the normal RTK can be executed, the flow shifts to S116.

In S116, the position estimation unit 150 estimates the distance from the reference station to the vehicle A based on the normal RTK. After the process of S116 is executed, the flow advances to S220. Note that when the process shifts from S116 to S220, the position estimation unit 150 may estimate the current position based on the distance from the reference station to the vehicle A in S220.

Other Embodiments

The present disclosure is not limited to the above-described embodiments. The present disclosure includes embodiments described above and modifications of the above-described embodiments made by a person skilled in the art. For example, the disclosure is not limited to components and/or combinations of elements presented in the embodiments provided herein. The present disclosure may be implemented in various combinations thereof. The disclosure may have additional components that can be added to the embodiments. The present disclosure also includes modifications which include partial components/elements of the above-described embodiments. The present disclosure includes replacements of components and/or elements between one embodiment and another embodiment, or combinations of components and/or elements between one embodiment and another embodiment The disclosed technical scope is not limited to the description of the embodiments. It should be understood that some disclosed technical scope are indicated by description of claims, and includes every modification within the equivalent scope and the scope of description of claims.

In the above-described embodiment, the dedicated computer that constitutes the movement amount estimation device is the locator ECU 100. Alternatively, the dedicated computer that constitutes the movement amount estimation device may be the driving control ECU mounted on the vehicle A, or may be an actuator ECU that individually controls the traveling actuators of the vehicle A. Alternatively, the dedicated computer that constitutes the movement amount estimation device may be a navigation ECU. The dedicated computer that constitutes the movement amount estimation device may be an HCU (i.e., HMI (i.e., Human Machine Interface) Control Unit) that controls information presentation of the information presentation system. Also, the dedicated computer that constitutes the movement amount estimation device may be a server device provided outside the vehicle A. Also, the dedicated computer that constitutes the movement amount estimation device may be configured to estimate the movement amount of a mobile object other than the vehicle A, such as a mobile robot.

In the above embodiments, the locator ECU 100 outputs the estimated current position of the vehicle A based on the calculated movement amount. Instead of this, the locator ECU 100 may be configured to output the movement amount without estimating the current position. In this case, the output destination device such as the in-vehicle device 90 may estimate the current position based on the movement amount. Further, the locator ECU 100 may also output satellite positioning results in addition to the movement amount.

In the above-described embodiments, the priority determination unit 130 calculates the priority as the sum of multiple indices. Instead of this, the priority determination unit 130 may calculate the priority as the product of multiple indices. Alternatively, the priority determination unit 130 may exclude a combination in which any one of the indices is so low as to fall within the specified unacceptable range from the combinations used for the movement amount calculation.

In the above-described embodiment, the priority determination unit 130 calculates the satellite quality index based on the number of signals with no cycle slip. Instead of this, the priority determination unit 130 may set a higher satellite quality index for a satellite with a higher average value of the carrier-to-noise ratio. Alternatively, the priority determination unit 130 may set the satellite quality index based on a priority of parameters including the number of signals with no cycle slip and the average value of the carrier-to-noise ratio.

In the above-described embodiment, the priority determination unit 130 calculates the reliability based on the estimation error of the past position or the entropy of the point group. Instead of this, the priority determination unit 130 may set the higher reliability as the number of satellites used in the normal RTK increases in the configuration using the normal RTK for the self-position estimation. Alternatively, the priority determination unit 130 may set a higher reliability as the ratio obtained by a ratio test is higher. Alternatively, the priority determination unit 130 may set the reliability based on the plurality of parameters described above.

In the first embodiment described above, the simple positioning unit 120 calculates the movement distance by dead reckoning. Alternatively, the simple positioning unit 120 may calculate the movement distance based on satellite positioning results such as time difference RTK, which will be described later.

The locator ECU 100 of the modification may be a special purpose computer configured to include at least one of a digital circuit and an analog circuit as a processor. Here, in particular, the digital circuit may include at least one of an application specific integrated circuit (ASIC), a field programmable gate array (FPGA), a system on a chip (SOC), a programmable gate array (PGA), a complex programmable logic device (CPLD), and the like, for example. Such a digital circuit may include a memory in which a program is stored.

The locator ECU 100 may be provided by a set of computer resources linked by a computer or a data communication device. For example, some of the functions provided by the locator ECU 100 in the above-described embodiment may be implemented by another ECU or a server device.

The travel of the vehicle may be controlled using the movement amount calculated by the movement calculation unit. Further, the calculated movement amount and data calculated based on the movement amount, such as, for example, a travel route, may be displayed on the display. Furthermore, based on the calculated movement amount and data, the form of the content displayed on the display may be changed, and it may be utilized in a route navigation system or the like.

Here, the process of the flowchart or the flowchart described in this application includes a plurality of sections (or steps), and each section is expressed as, for example, S100. Further, each section may be divided into several subsections, while several sections may be combined into one section. Furthermore, each section thus configured may be referred to as a device, module, or means.

The invention claimed is:

1. A movement amount estimation device for estimating a movement amount from at least one of a plurality of past points to a current point of a mobile object equipped with a receiver for receiving satellite data from a positioning satellite, the movement amount estimation device comprising:

at least one of (i) a circuit and (ii) a processor with a memory storing computer program code executable by the processor, the at least one of the circuit and the processor configured to cause the movement amount estimation device to:

calculate an index based on a combination of each past satellite data, which has been acquired by the receiver at the plurality of past points and stored in a buffer, and current satellite data, which is acquired by the receiver at the current point;

determine a degree of a priority based on the calculated index for using the priority for estimating the movement amount; and calculate a relative movement amount from the at least one of the plurality of past points to the current point based on, among the combination of each past satellite data and the current satellite data, a combination of a high priority range having a higher priority than a low priority range.

2. The movement amount estimation device according to claim 1, wherein
the at least one of the circuit and the processor further cause the movement amount estimation device to increase the priority of the combination as a movement distance difference of the combination between a movement distance of the mobile object from a reference point to the at least one of the plurality of past points and a movement distance from the reference point to the current point is larger.

3. The movement amount estimation device according to claim 1, wherein
the at least one of the circuit and the processor further cause the movement amount estimation device to increase the priority of the combination as an elapsed time for the combination from an acquisition time of the past satellite data to an acquisition time of the current satellite data is shorter.

4. The movement amount estimation device according to claim 1, wherein
the at least one of the circuit and the processor further cause the movement amount estimation device to increase the priority of the combination as a quality of the past satellite data for the combination is higher.

5. The movement amount estimation device according to claim 1, wherein
the at least one of the circuit and the processor further cause the movement amount estimation device to increase the priority of the combination as a reliability of an estimation position at the at least one of the plurality of past points for the combination is higher.

6. The movement amount estimation device according to claim 1, wherein
the at least one of the circuit and the processor further cause the movement amount estimation device to determine the priority based on a plurality of indices, and
set a weight for each of the plurality of indices according to a condition.

7. The movement amount estimation device according to claim 6, wherein
the plurality of indices include a distance difference index that is a difference between a movement distance of the mobile object from a reference point to the at least one of the plurality of past points and a movement distance from the reference point to the current point, and
the at least one of the circuit and the processor further cause the movement amount estimation device to set the weight of the distance difference index to be smaller as a movement speed of the mobile object is smaller.

8. A movement amount estimation method executed by a processor for estimating a movement amount from at least one of a plurality of past points to a current point of a mobile object equipped with a receiver for receiving satellite data from a positioning satellite, the movement amount estimation method comprising:
calculating an index based on a combination of each past satellite data, which has been acquired by the receiver at the plurality of past points and stored in a buffer, and current satellite data, which is acquired by the receiver at the current point;
determining a degree of a priority based on the calculated index for using the priority for estimating the movement amount; and calculating a relative movement amount from the at least one of the plurality of past points to the current point based on, among the combination of each past satellite data and the current satellite data, a combination of a high priority range having a higher priority than a low priority range.

9. The movement amount estimation method according to claim 8, further comprising
increasing the priority of the combination as a movement distance difference of the combination between a movement distance of the mobile object from a reference point to the at least one of the plurality of past points and a movement distance from the reference point to the current point is larger.

10. The movement amount estimation method according to claim 8, further comprising
increasing the priority of the combination as an elapsed time for the combination from an acquisition time of the past satellite data to an acquisition time of the current satellite data is shorter.

11. The movement amount estimation method according to claim 8, further comprising
increasing the priority of the combination as a quality of the past satellite data for the combination is higher.

12. The movement amount estimation method according to claim 8, further comprising
increasing the priority of the combination as a reliability of an estimation position at the at least one of the plurality of past points for the combination is higher.

13. The movement amount estimation method according to claim 8, further comprising
determining the priority based on a plurality of indices, and
setting a weight for each of the plurality of indices according to a condition.

14. The movement amount estimation method according to claim 13, wherein
the plurality of indices include a distance difference index that is a difference between a movement distance of the mobile object from a reference point to the at least one of the plurality of past points and a movement distance from the reference point to the current point, and
the method further includes setting the weight of the distance difference index to be smaller as a movement speed of the mobile object is smaller.

15. A computer-readable non-transitory storage medium storing a movement amount estimation program including a plurality of instructions configured to, when executed by a processor for estimating a movement amount from at least one of a plurality of past points to a current point of a mobile object equipped with a receiver for receiving satellite data from a positioning satellite, cause the processor to:
calculate an index based on a combination of each past satellite data, which has been acquired by the receiver at the plurality of past points and stored in a buffer, and current satellite data, which is acquired by the receiver at the current point;
determine a degree of a priority based on the calculated index for using the priority for estimating the movement amount; and
calculate a relative movement amount from the at least one of the plurality of past points to the current point based on, among the combination of each past satellite data and the current satellite data, a combination of a high priority range having a higher priority than a low priority range.

* * * * *